Aug. 25, 1936.                J. GARLING                 2,052,345
                              MOUSE TRAP
                         Filed Sept. 27, 1935
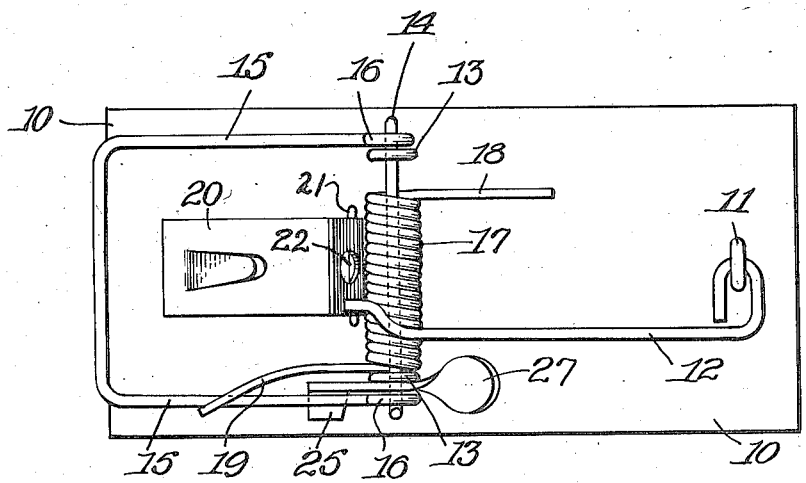
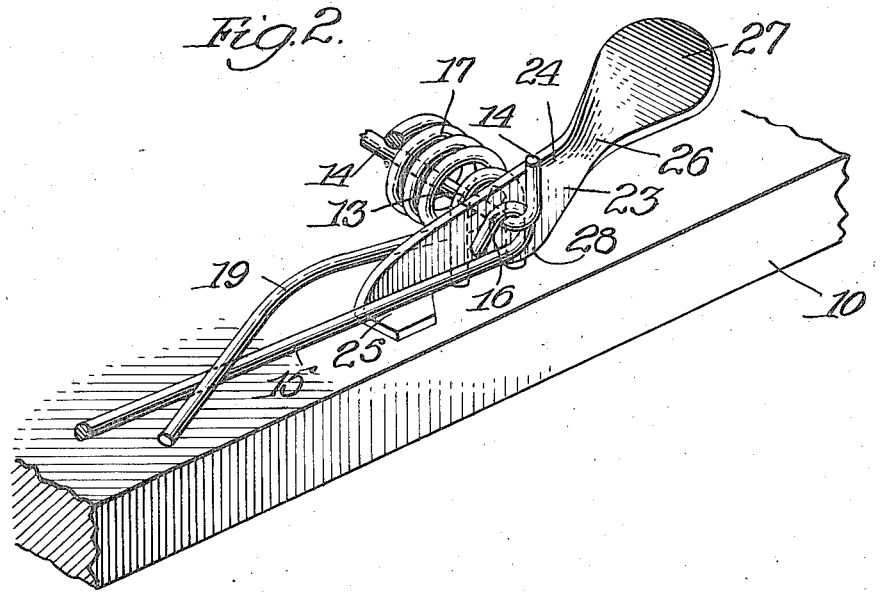
Inventor:
John Garling,
By Dyrenforth, Lee, Chritton & Wiles
Attys Patented Aug. 25, 1936

2,052,345

UNITED STATES PATENT OFFICE 2,052,345

MOUSE TRAP

John Garling, Joliet, Ill., assignor to William E. Pratt Mfg. Co., Joliet, Ill., a corporation of Illinois Application September 27, 1935, Serial No. 42,506

2 Claims. (Cl. 43—81)

This invention relates to a mouse trap and, more particularly, to a mouse trap equipped with ejecting means.

An object of the invention is to provide a mouse trap equipped with means for partially opening the trap after it has closed. A further object is to provide an attachment which may be secured to an ordinary mouse trap, the attachment enabling the jaw of the trap to be raised. Other specific objects and advantages will appear as the specification proceeds.

The invention is illustrated in a preferred embodiment, by the accompanying drawing, in which—

Figure 1 is a plan view of a mouse trap equipped with an ejector device embodying my invention; and Fig. 2, a broken perspective view showing in detail the ejector lever.

In the illustration given, 10 designates a base or platform having at its rear side a staple 11 to which is pivotally connected a lock stem 12.

The base or block 10 is provided at an intermediate point with the usual pair of spaced staples 13 through which extends a pivot bar 14. A wire jaw 15, of the usual construction, has its ends turned to provide metal loops 16 extending about the pivot bar 14. A coil spring 17 extends about the pivot bar 14, one of the ends 18 of the spring extending rearwardly and engaging the top of the block 10 and the other end 19 extending forwardly and engaging one side of the jaw 15. In this position, the spring 17 urges the jaw downwardly into engagement with the block 10.

A pedal or trigger 20 is pivotally secured to the staple 21 at the front part of the block 10. The pedal 20 is provided at its rear side with a vertical wall having a perforation 22 therein and adapted to receive the forward end of lock stem 12.

The ejector device 23 may be of any suitable construction. In the illustration given, it comprises a metal piece having a central vertical flange 24 perforated to receive the pivot bar 14. The forward end of flange 24 is provided near its bottom with a laterally extending flange 25 adapted to engage the bottom portion of jaw 15. The rear portion of the metal strip 23 is preferably twisted at 26 to provide a flat thumb-rest 27.

In the operation of the device, the jaw 15 is raised against the force of spring 17 and swung to a position to the rear of spring 17. It is confined in this position by lock stem 12, the forward end of which is brought into engagement with the opening 22 of pedal 20, the pedal 20 being raised in order to enable the stem 12 to engage opening 22. Ordinarily, a bait of some sort is placed on the pedal 20. The pressure exerted by spring 17 against jaw 15 and thereby against stem 12 causes the pedal 20 to remain in elevated position. When the pedal 20 is depressed by a mouse, stem 12 is released and the jaw 15 flies to the forward position illustrated in Fig. 1. When the operator desires to release the jaw 15 from engagement with the mouse, it is only necessary to depress the thumb-rest 27. The forward horizontal flange 25 engages jaw 15 and raises it at a sufficient angle to permit disengagement. By this means, it is not necessary for the operator to touch the mouse or any portion of the trap which has been in engagement with it.

The ejector device 23 is also of assistance in setting the trap. By elevating the jaw 15, the operator is able to grasp the jaw with ease and spring it to its rearmost position.

The ejector device 23 is illustrated in the form of an attachment. It can be put into position on substantially any mouse trap as now constructed, by passing one end of the pivot bar 14 through the opening of the member 23. It will be understood, however, that the ejector device may be constructed as a fixed or integral part of the trap mechanism.

The bar 23 is preferably provided near its lower central portion with a rocker projection 28 which, when the entire bar 23 is pressed downwardly, strikes the block 10 and rocks thereon. In other words, it is not necessary for the member 23 to be supported pivotally upon wire 14 but the bar 23 may, if desired, rock on the block.

The foregoing detailed description has been given for clearness of understanding only, and no unnecessary limitations should be understood therefrom, but the appended claims should be construed as broadly as permissible, in view of the prior art.

What I claim as new, and desire to secure by Letters Patent, is:

1. In combination with a mouse trap comprising a block, a pivot member extending across said block, means for confining said pivot member to said block, a striker pivotally mounted on said pivot member, a spring extending about said pivot member and normally urging said striker toward closed position, and an ejector device comprising a metal member having a curved rocker bottom, a rearwardly extending thumb-rest and a forwardly extending arm engaging the underside of said jaw, said ejector being centrally apertured to receive said pivot member.

2. In combination with a mouse trap comprising a jaw, a pivot member extending across said block, a spring extending about said pivot member, a staple means securing said pivot member above said block, a jaw pivotally mounted on said pivot member, a coil spring encircling said pivot member and normally urging said jaw toward closed position, and an ejector device comprising a vertical body having a curved rocker bottom resting on said block, said ejector device having a rearwardly extending thumb-member and a forwardly extending arm, said forwardly extending arm having a lateral flange extending under said jaw.

JOHN GARLING.